United States Patent
Shiraishi

(10) Patent No.: US 8,780,157 B2
(45) Date of Patent: Jul. 15, 2014

(54) IMAGING ELEMENT ARRAY AND IMAGE FORMING APPARATUS

(71) Applicant: Toshiba TEC Kabushiki Kaisha, Tokyo (JP)

(72) Inventor: Takashi Shiraishi, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/632,235

(22) Filed: Oct. 1, 2012

(65) Prior Publication Data
US 2013/0100514 A1    Apr. 25, 2013

(30) Foreign Application Priority Data
Oct. 19, 2011 (JP) .................. 2011-229866

(51) Int. Cl.
| B41J 2/385 | (2006.01) |
|---|---|
| B41J 2/47 | (2006.01) |
| B41J 2/45 | (2006.01) |
| B41J 15/14 | (2006.01) |
| B41J 27/00 | (2006.01) |
| G02B 21/36 | (2006.01) |
| G02B 17/00 | (2006.01) |

(52) U.S. Cl.
USPC ........... 347/244; 347/118; 347/130; 347/137; 347/232; 347/238; 347/258; 359/363; 359/364

(58) Field of Classification Search
USPC ......... 347/111, 112, 115, 117, 118, 129, 130, 347/134, 137, 224, 225, 232, 233, 238, 241, 347/244, 256, 258; 359/362, 363, 364
See application file for complete search history.

(56) References Cited

U.S. PATENT DOCUMENTS

| 5,902,993 | A * | 5/1999 | Okushiba et al. ........... 250/208.1 |
|---|---|---|---|
| 2001/0028506 | A1 * | 10/2001 | Fujimoto et al. .............. 359/622 |
| 2003/0007067 | A1 * | 1/2003 | Masuda et al. ................. 347/241 |
| 2005/0088705 | A1 * | 4/2005 | Okamoto et al. ............. 358/474 |
| 2010/0014062 | A1 * | 1/2010 | Hashimoto et al. ............. 355/55 |
| 2011/0216418 | A1 | 9/2011 | Shiraishi |
| 2012/0200900 | A1 * | 8/2012 | Takeda et al. ................. 358/484 |

FOREIGN PATENT DOCUMENTS

| JP | 04-149485 | 5/1992 |
|---|---|---|
| JP | 06-276355 | 9/1994 |
| JP | 2000-241754 | 9/2000 |
| JP | 2002-062407 | 2/2002 |
| JP | 2002-178555 | 6/2002 |
| JP | 2003-098474 | 4/2003 |

OTHER PUBLICATIONS

Japanese Office Action for Japanese Patent Application No. 2011-229866 mailed on Oct. 1, 2013.

* cited by examiner

*Primary Examiner* — Alessandro Amari
*Assistant Examiner* — Kendrick Liu
(74) *Attorney, Agent, or Firm* — Amin, Turocy & Watson, LLP

(57) ABSTRACT

According to one embodiment, there is provided an imaging element array including an imaging element group in which a plurality of imaging elements are aligned, each of the imaging elements including an integrally molded input portion, an output portion, and a reflective portion, collecting light input to the input portion, reflecting the light by the reflective portion near a position where light flux is downsized, and outputting the reflected light from the output portion to form an image at an image point, and an inhibiting portion which is formed around the reflected portion in the imaging element group to inhibit light other than the light reflected by the reflective portion from traveling to the output portion.

10 Claims, 15 Drawing Sheets

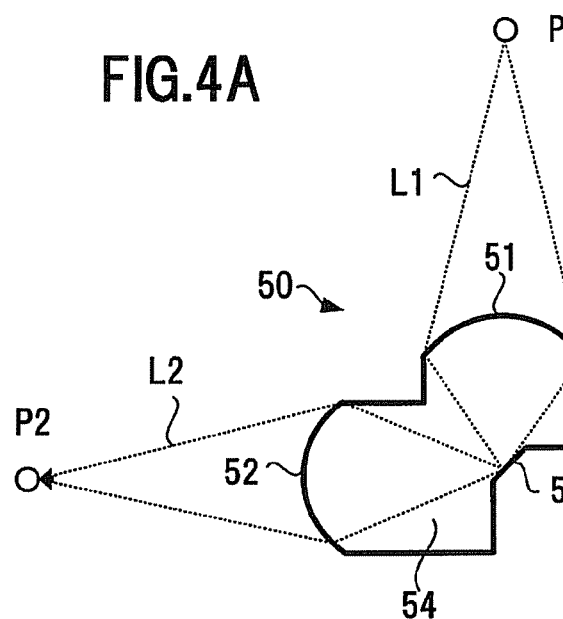
FIG.4A
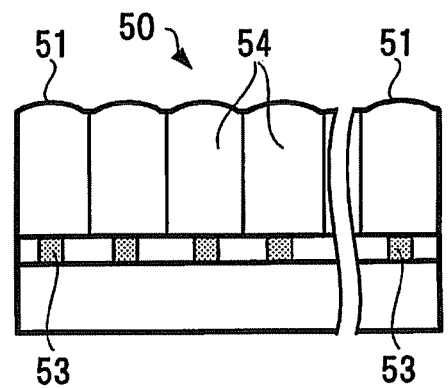
FIG.4B
FIG.5
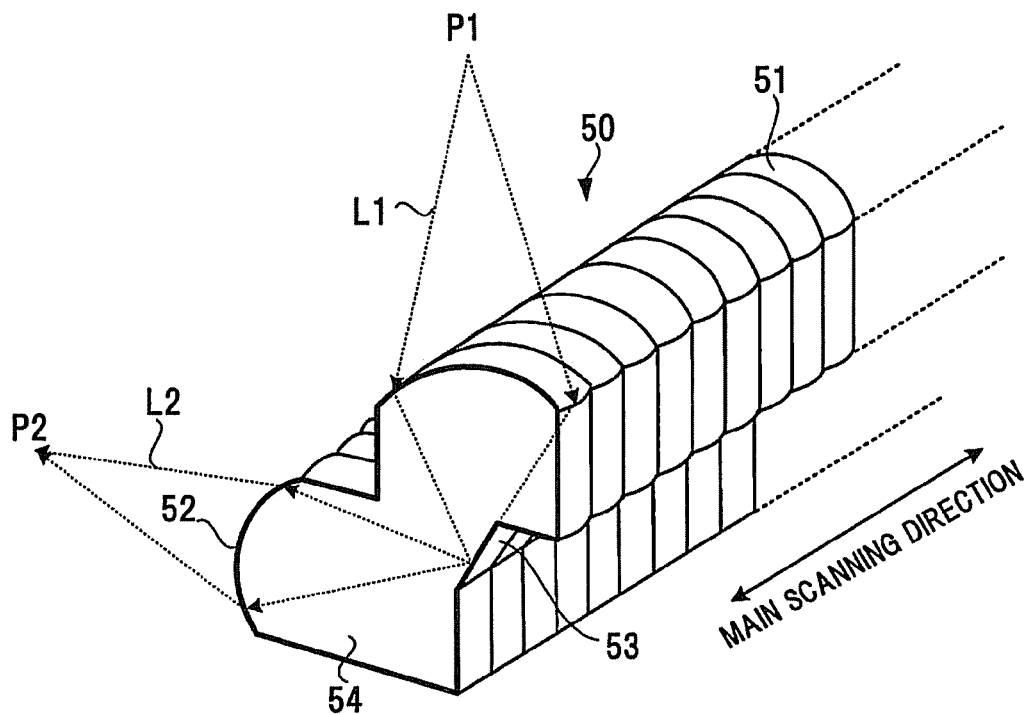

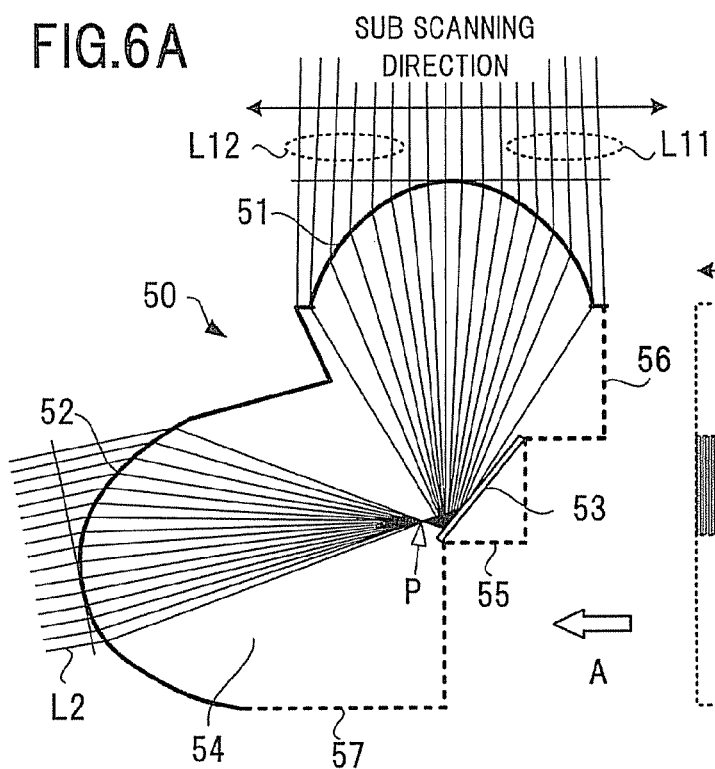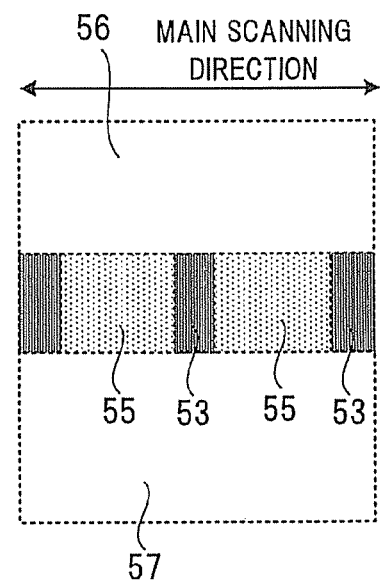
FIG.6A SUB SCANNING DIRECTION
FIG.6B MAIN SCANNING DIRECTION
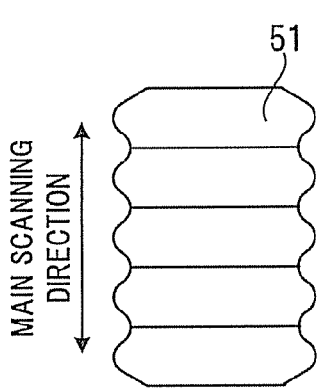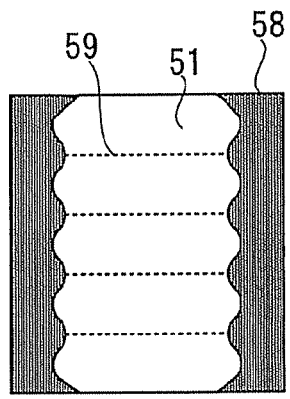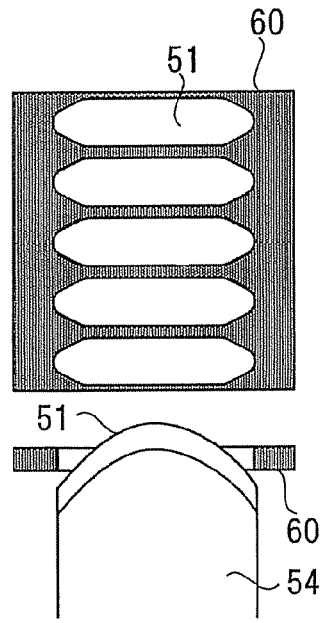
FIG.7A  FIG.7B  FIG.7C

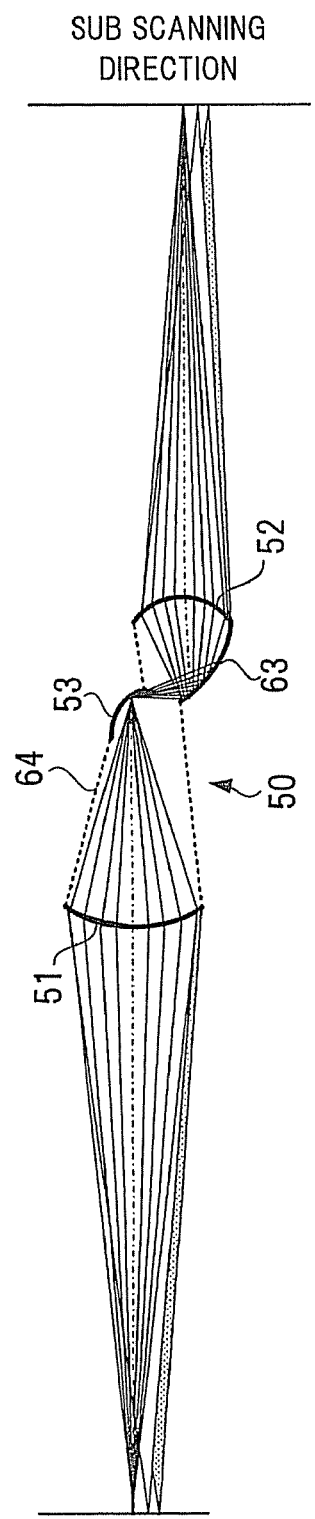
FIG.12A  SUB SCANNING DIRECTION
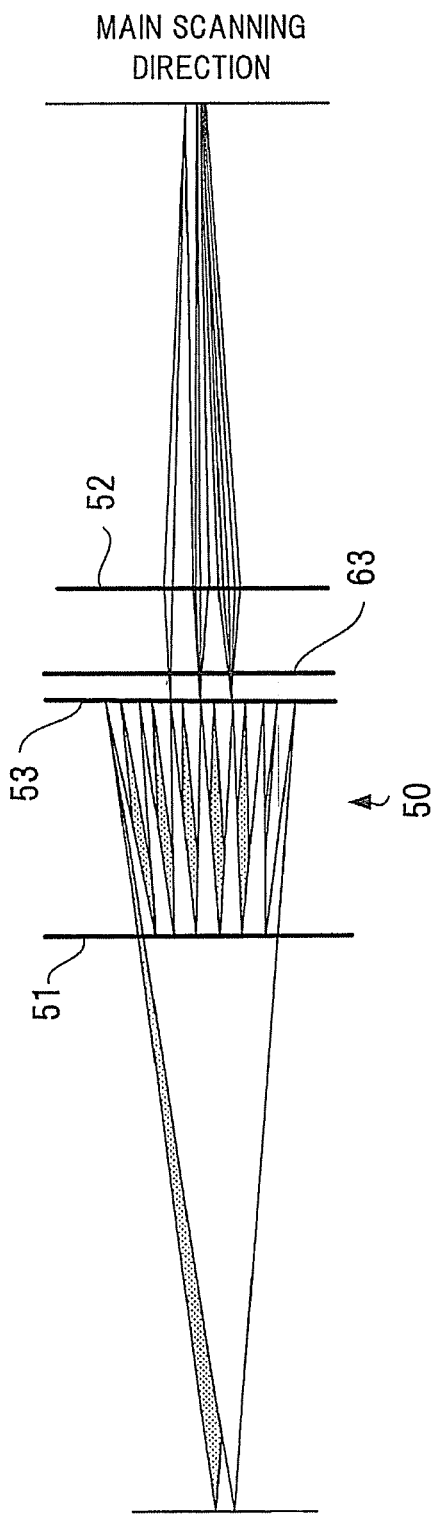
FIG.12B  MAIN SCANNING DIRECTION Image Patch Size = 2.000mm × 2.000mm

F

Irradiance at (0.000, 0.000) is 0.832

MAIN SCANNING DIRECTION

US 8,780,157 B2

IMAGING ELEMENT ARRAY AND IMAGE FORMING APPARATUS

CROSS-REFERENCE TO RELATED APPLICATION

This application is based upon and claims the benefit of priority from the prior Japanese Patent Application No. 2011-229866, filed on Oct. 19, 2011 the entire contents of which are incorporated herein by reference.

FIELD

Embodiments described herein relate to an imaging element array configured by a lens array or a mirror array and an image forming apparatus using the imaging element array.

BACKGROUND

Recently, an image forming apparatus such as a scanner, a printer, a copy machine, or a multi-function peripheral (MFP) is designed to form an image of a document on an image sensor and read the image of the document using a light emitting element such as an LED and a lens array in which a plurality of lenses are aligned. In addition, an image of a light beam from the LED is formed on a photoconductive drum via the lens array using the light emitting element such as an LED and the lens array, and the image is formed (exposure) on the photoconductive drum. As the lens array, a combination of a plurality of lenses and apertures is exemplified. In addition, an imaging property and a variation in light intensity are significantly degraded in the lens array if optical axes deviate from each other between lenses through which one light beam passes.

There is also an imaging element array in which lens elements are integrally provided to avoid performance degradation and increase in cost due to a deviation during assembly. For example, the imaging element array is configured by a transparent part and an opaque part, and the transparent part includes two lens surfaces, namely an input surface and an output surface. In addition, the imaging element array includes a prism surface (reflective surface) for guiding light flux from the input surface to the output surface.

However, since the reflective surface is arranged at a position through which a wide light beam passes, high reflection accuracy is required over the entire wide region. Moreover, a long formation time should be set in order to enhance the accuracy. A deviation in a shape of the reflective surface from a designed value influences on disturbance of a wave front four times as much as the influence of a deviation in a shape of a transparent surface, and not desirable to arrange the reflective surface at a position of large light flux. In addition, two kinds of molded materials, namely a transparent member and a light shielding member and time and effort for setting an opaque part material in a transparent part material before molding are necessary, and there is a disadvantage in that molding of the imaging element array is not easily performed.

BRIEF DESCRIPTION OF THE DRAWINGS

FIGS. 4A and 4B are a front view and a side view showing a basic configuration of an imaging element array (lens array) according to the embodiment.
FIG. 5 is a perspective view of the lens array according to the embodiment.
FIGS. 6A and 6B are a front view and a side view showing a specific configuration of the lens array according to the embodiment.
FIGS. 7A to 7C are explanatory diagrams showing examples in which a variation in light intensity of the lens array is reduced according to the embodiment.
FIGS. 12A and 12B are a front view and a planar view showing still another modified example of the lens array according to the embodiment.

DETAILED DESCRIPTION

Figure 1:
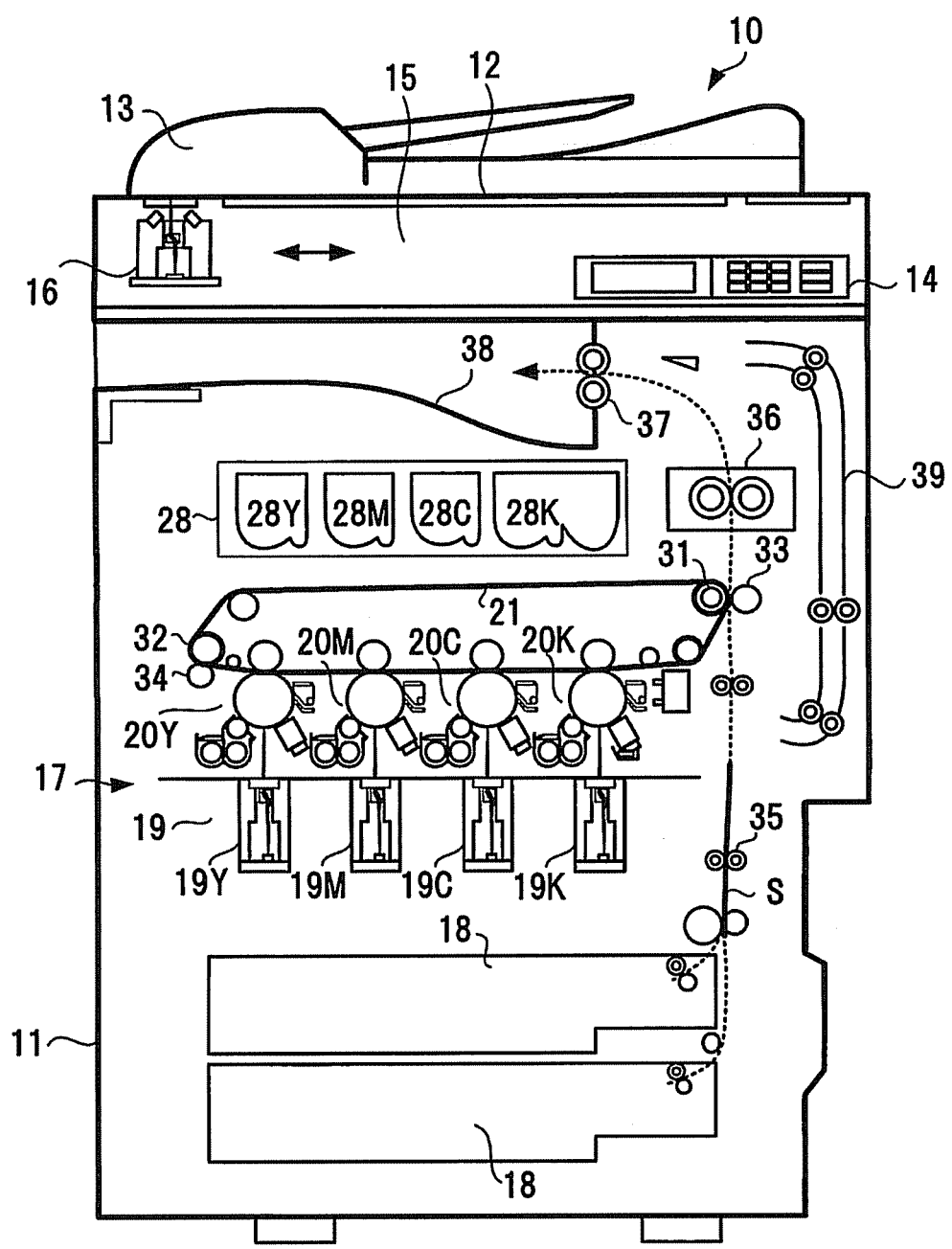
FIG. 1 is a configuration diagram of an image forming apparatus according to an embodiment.

In general, according to one embodiment, there is provided an imaging element array including: an imaging element group in which a plurality of imaging elements are aligned, each of the imaging elements including an integrally molded input portion, an output portion, and a reflective portion, collecting light input to the input portion, reflecting the light by the reflective portion near a position where light flux is downsized, and outputting the reflected light from the output portion to form an image at an image point; and an inhibiting portion which is formed around the reflected portion in the imaging element group to inhibit light other than the light reflected by the reflective portion from traveling to the output portion.

Hereinafter, description will be given of exemplary embodiments with reference to drawings. In addition, same reference numerals will be given to same parts in the drawings.

First Embodiment

FIG. 1 is a configuration diagram of an image forming apparatus according to an embodiment. In FIG. 1, an image forming apparatus 10 is a multi-function peripheral (MFP) a printer, a copy machine, or the like. The following description will be given of an example of the MFP.

A document table 12 made of transparent glass is provided above a main body 11 of the MFP 10, and an automatic document feeding unit (ADF) 13 is provided on the document table 12 so as to be freely opened and closed. In addition, an operation panel 14 is provided above the main body 11. The operation panel 14 includes various keys and a touch panel type display unit.

A scanner unit 15 as a reading device is provided below the ADF 13 in the main body 11. The scanner unit 15 is for reading a document sent by the ADF 13 or placed on the document table and generating image data, and is provided with a contact type image sensor 16 (hereinafter, simply referred to as an image sensor). The image sensor 16 is arranged in a main scanning direction (a depth direction in FIG. 1).

The image sensor 16 moves along the document table 12 for reading an image of a document placed on the document table 12 and reads the image of the document by one line while moving. The reading of the image of the document is executed over the entire document size, and the document corresponding to one page is read. In addition, if an image of the document sent by the ADF 13 is read, the image sensor 16 is at a fixed position (a position shown in the drawing).

Furthermore, a printer unit 17 is provided at the center in the main body 11, and a plurality of cassettes 18 containing sheets of various sizes are provided below the main body 11. The printer unit 17 includes a photoconductive drum, an exposing unit, and the like. The exposing unit includes a scanning head 19 including an LED as a light emitting element, scans the photoconductive body with a light beam from the scanning head 19, and generates an image.

The printer unit 17 processes image data read by the scanner unit 15 or image data created by a PC (personal computer) or the like and forms an image on a sheet as a recording medium. The printer unit 17 is a tandem color laser printer, for example, and includes image forming units 20Y, 20M, 20C, and 20K for colors of yellow (Y), magenta (M), cyan (C), and black (K). The image forming units 20Y, 20M, 20C, and 20K are arranged in parallel from an upstream side to a downstream side below an intermediate transfer belt 21. In addition, the scanning head 19 also includes a plurality of scanning heads 19Y, 19M, 19C, and 19K corresponding to the image forming units 20Y, 20M, 20C, and 20K.

Figure 2:
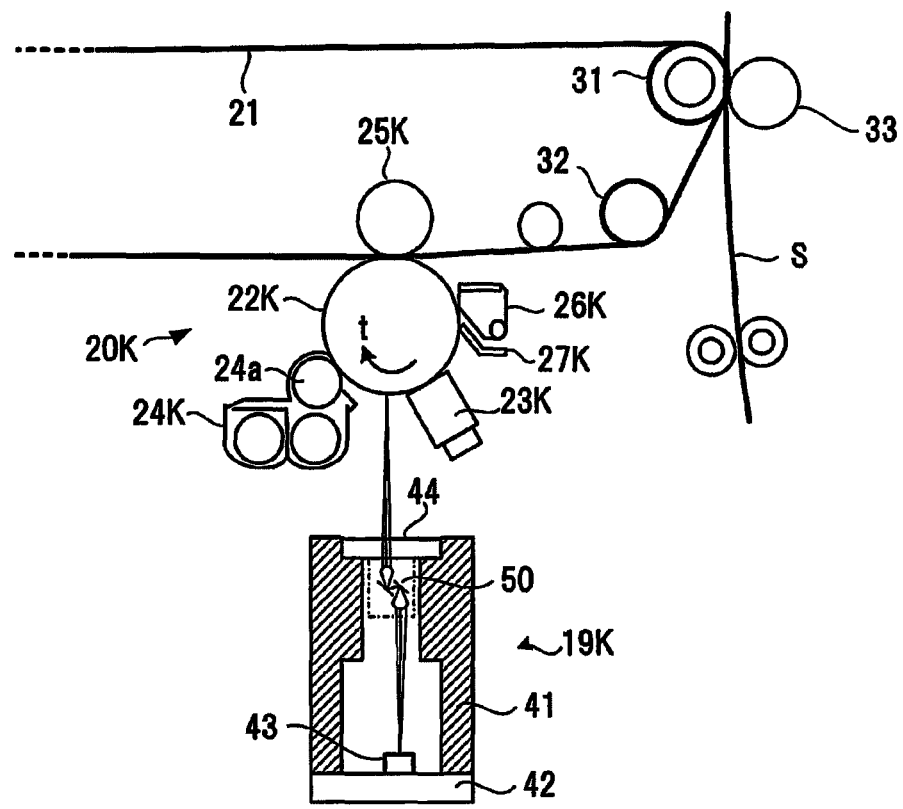
FIG. 2 is a configuration diagram showing an enlarged part of an image forming unit according to the embodiment.

FIG. 2 is a configuration diagram showing the image forming unit 20K among the image forming units 20Y, 20M, 20C, and 20K in an enlarged manner. In addition, since the image forming units 20Y, 20M, 20C, and 20K have the same configuration, the following representative description will be given of the image forming unit 20K.

As shown in FIG. 2, the image forming unit 20K includes a photoconductive drum 22K as an image carrier. An electric charger 23K, a developer 24K, a primary transfer roller 25K, a cleaner 26K, a blade 27K, and the like are arranged along a rotation direction t around the photoconductive drum 22K. The exposure position in the photoconductive drum 22K is irradiated with light from the scanning head 19K, and an electrostatic latent image is carried on the photoconductive drum 22K.

The electric charger 23K in the image forming unit 20K uniformly charges the entire surface of the photoconductive drum 22K. The developer 24K configuring the developing unit supplies two-component developing agent containing black toner and carrier to the photoconductive drum 22K by a developing roller 24a to which developing bias is applied and forms a toner image on the photoconductive drum 22K. The cleaner 26K removes remaining toner on the surface of the photoconductive drum 22K using the blade 27K.

In addition, as shown in FIG. 1, a toner cartridge 28 which supplies toner to the developers 24Y to 24K is provided above the image forming units 20Y to 20K. The toner cartridge 28 includes toner cartridges of the colors of yellow (Y), magenta (M), cyan (C), and black (K).

The intermediate transfer belt 21 is stretched over a driving roller 31 and a driven roller 32 and cyclically moves. In addition, the intermediate transfer belt 21 faces the photoconductive drums 22Y to 22K in a contact manner. As shown in FIG. 2, the primary transfer roller 25K configuring a transferring unit is disposed at a position in the intermediate transfer belt 21 facing the photoconductive drum 22K. The primary transfer roller 25K applies primary transfer voltage and primarily transfers a toner image on the photoconductive drum 22K to the intermediate transfer belt 21.

A secondary transfer roller 33 configuring the transferring unit is arranged so as to face the driving roller 31 over which the intermediate transfer belt 21 is stretched. While a sheet S passes between the driving roller 31 and the secondary transfer roller 33, the secondary transfer roller 33 applies secondary transfer voltage to the sheet S. Then, the toner image on the intermediate transfer belt 21 is secondarily transferred to the sheet S. A belt cleaner 34 is provided near the driven roller 32 of the intermediate transfer belt 21.

As shown in FIG. 1, a transport roller 35 which transports the sheet S ejected from the sheet supply cassette 18 is provided between the sheet supply cassette 18 and the secondary transfer roller 33. Furthermore, a fixer 36 is provided on the downstream side of the secondary transfer roller 33. In addition, a transport roller 37 is provided on the downstream side of the fixer 36. The transport roller 37 discharges the sheet S to a sheet discharge unit 38.

Furthermore, an inversion transport path 39 is provided on the downstream side of the fixer 36. The inversion transport path 39 is for inverting the sheet S and guiding the sheet S to the direction of the secondary transfer roller 33 and is used in performing double-sided printing.

Next, description will be given of a configuration of the scanning head 19K with reference to FIG. 2. The scanning head 19K faces the photoconductive drum 22K and functions as an exposure unit. The photoconductive drum 22K rotates at a preset rotation speed, can accumulate electric charge on the surface thereof, irradiates the photoconductive drum 22K with light from the scanning head 19K and exposes the photoconductive drum 22K to the light, and forms an electrostatic latent image on the surface of the photoconductive drum 22K.

The scanning head 19K includes a lens array 50, and the lens array 50 is supported by a holding member 41. A supporting body 42 is provided at the bottom of the holding member 41, and LED elements 43 as light emitting elements are arranged in the supporting body 42. The LED elements 43 are linearly provided at an equal interval in the main scanning direction. In addition, a substrate (not shown) including a driver IC which controls light emission of the LED elements 43 is arranged in the supporting body 42. Moreover, a configuration of the lens array 50 will be described in detail later.

The driver IC configures a control unit, generates a control signal of the scanning head 19K based on image data, and causes the LED element to emit light by predetermined light intensity based on the control signal. Then, the light beams emitted from the LED elements 43 are input to the lens array 50, pass through the lens array 50, and form an image on the photoconductive drum 22K. Then, the image is formed on the photoconductive drum 22K. In addition, a cover glass 44 is attached to the upper portion (on the output side) of the scanning head 19K.

Figure 3:
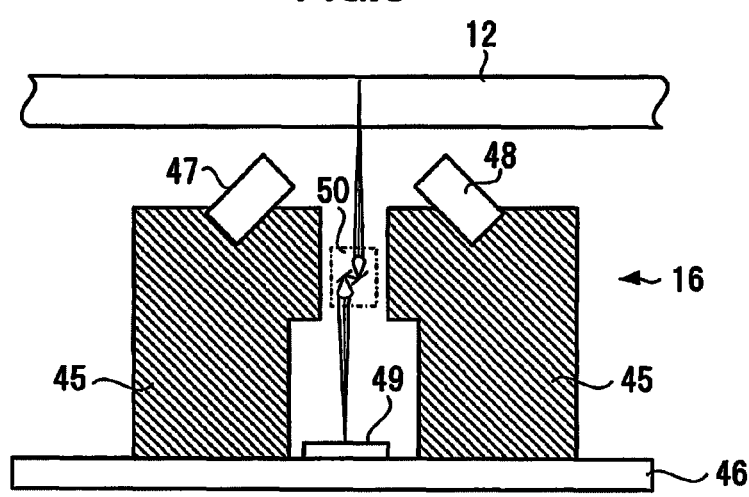
FIG. 3 is a configuration diagram of an image reading device (image sensor) according to the embodiment.

FIG. 3 is an explanatory diagram showing a configuration of a sensor unit of the reading device 15. The image sensor 16 which configures the sensor unit reads an image of the document placed on the document table 12 or an image of the document supplied by the ADF 13 in response to an operation of the operation panel 14. The image sensor 16 is a one-dimensional sensor arranged in the main scanning direction and includes a case body 45. The case body 45 is arranged on a substrate 46, and two LED line illumination units 47 and 48 for light irradiation in the direction to the document are provided so as to extend in the main scanning direction (the depth direction in the drawing) on the upper surface of the case body 45 on the side of the document table 12. The LED line illumination units 47 and 48 are provided with an LED array and a light guiding body. In addition, a light source is not limited to the LED, and a fluorescent tube, a xenon tube, a cold-cathode tube, an organic EL, or the like may be used.

The lens array 50 is supported between the LED line illumination units 47 and 48 above the case body 45, and a sensor 49 configured by a CCD or a CMOS or the like is mounted on the substrate 46 at the bottom of the case body 45. The LED line illumination units 47 and 48 irradiate an image reading position in the document on the document table 12, and the light reflected by the image reading position is input to the lens array 50. The lens array 50 functions as an erect equal-magnification lens. The light input to the lens array 50 output from the output surface of the lens array 50 and forms an image on the sensor 49. The light which has formed the image is converted into an electric signal by the sensor 49, and the electric signal is transferred to a memory unit (not shown) on the substrate 46.

Next, description will be given of a configuration of the lens array 50. FIGS. 4A, 4B and FIG. 5 are diagrams showing a basic configuration of the lens array 50 (imaging element array) according to a first embodiment, where FIG. 4A is a front view of the lens array 50, FIG. 4B is a side view of the lens array 50, and FIG. 5 is a perspective view of the lens array 50.

The lens array 50 is provided with a lens element group configured by a plurality of lens elements 54. Each of the lens elements 54 is configured by one lens member which includes an input lens surface 51 as an input portion, an output lens surface 52 as an output portion, and a reflective portion (reflective surface 53) by which the input light from the input lens surface 51 is reflected to the output lens surface 52. In the lens array 50, the plurality of lens elements 54 are aligned in the main scanning direction such that the input surfaces are adjacent to each other and the output surfaces are adjacent to each other as shown in FIG. 5. In addition, the lens elements 54 are integrally formed by resin or glass.

As shown in FIG. 4A, an input light beam L1 is first input to the input lens surface 51, and the lens element includes the reflective surfaces 53 respectively corresponding to image position of the light input to the input lens surface 51. The reflective surfaces 53 are inclined with respect to the input light at an angle which satisfies total reflection conditions. Accordingly, the light beam can be reflected to the output lens surface 52 without depositing a reflective film. As shown in FIG. 4B, each lens element 54 is arranged in a line, and the reflective surfaces 53 are positioned at an equal interval behind the lens elements 54.

In addition, as the reflective surfaces 53, reflective members may be disposed at an angle which does not satisfy all reflection conditions. Although costs may be slightly increased, possible to use an advantage in that no positional deviation occurs during assembly and the same functions can be achieved.

If the lens array 50 is used in the scanning head 19 in FIG. 1, an object point P1 corresponds to the LED element 43, and an image plane (P2) corresponds to the photoconductive drum 22. If the lens array 50 is used in the image sensor 16 in FIG. 1, the object point P1 corresponds to the surface of the document placed on the document table 12, and the image plane (P2) corresponds to the sensor 49.

FIGS. 6A and 6B are diagrams showing a specific configuration of the lens array 50, wherein FIG. 6A is a front view, and FIG. 6B is a side view of the lens array 50 viewed in a direction of an arrow A. As shown in FIGS. 6A and 6B, the lens array 50 includes supporting surface 55, 56, and 57 supported by a supporting member such as a case body. As shown in FIG. 6B, the supporting surfaces are respectively arranged between the reflective surfaces 53 and are set at an angle at which the light is guided toward a location other than the output lens surface 52. Alternatively, the supporting surface 55 may transmit or reflect the light to the position other than the output lens surface 53. That is, the supporting surface 55 configures an inhibiting portion which is formed in the periphery of the reflective surfaces 53 to inhibit the light other than the light reflected by the reflective surface 53 from traveling to the output surface 52.

Although the reflective surface 53 is shown by a straight line in FIG. 6A, the reflective surface 53 has a free-form surface which is asymmetric in a sub scanning direction, such as a concave mirror (as will be described in detail later) in practice. In addition, as can be understood from FIG. 6A, the light beam is collected on a side which is slightly closer to the output lens surface 52 than the reflective surface 53 (an image position is shown as P).

In addition, a light beam (L11) on the right side in the input light in FIG. 6A is reflected by the reflective surface 53 at a position which is closer to the input lens surface 51, a light beam (L12) on the left side in the input light is reflected by the reflective surface 53 at a position which is far from the input lens surface 51, and the light beams are respectively directed to the output lens surface 52. A part of the reflective surface 53, which acts on the light reflected at a close position to the input lens surface 51, has relatively weaker power in the sub scanning direction than the other parts of the reflective surface 53. In addition, a part of the reflective surface 53, which acts on the light reflected at a distant position from the input lens surface 51, has relatively stronger power in the sub scanning direction than the other parts of the reflective surface 53. By forming the lens array 50 with the shape as shown in FIG. 6A, an image forming property can be enhanced.

On the other hand, if the image position P by the input lens surface 51 is positioned on a side which is closer to the input lens surface 51 than to the reflective surface 53, the part of the reflective surface 53, which acts on the light reflected at a close position to the input lens surface 51 (on the right side of the reflective surface 53 in FIG. 6A) has relatively stronger power in the sub scanning direction than the other parts of the reflective surface 53. In addition, the part of the reflective surface 53, which acts on the light reflected at a distant position from the input lens surface 51 (on the left side of the reflective surface 53 in FIG. 6A) has relatively weaker power in the sub scanning direction than the other parts of the reflective surface 53. Accordingly, by forming the lens array 50 with the shape as shown in FIG. 6A, the image forming property can be enhanced.

That is, a variation amount of an angle of the light beam is represented by a product between power and a height of the light beam. Be possible to equally set the light collecting position and to thereby enhance the image forming property by setting an absolute value of the power to be smaller as an absolute value of the height of the light beam is larger and setting the absolute value of the power to be larger as the absolute value of the height of the light beam is smaller.

Although a certain level of an image forming performance can be achieved if the input lens surface 51 and the output lens surface 52 are curved surfaces, the input lens surface 51 and the output lens surface 52 are preferably aspheric surfaces in order to obtain a better image forming performance (high MFT, resolution, small flare). In order to further enhance the image forming performance, the input lens surface 51 and the output lens surface 52 are preferably curved surfaces which are asymmetric in the sub scanning direction. In addition, the MFT is an abbreviation of Modulation Transfer Function which is a transfer function of amplitude.

The input lens surface 51 and the output lens surface 52 are formed to asymmetric surfaces in the sub scanning direction because difficult to correct only with the reflective surface 53 an influence that a reflection position at the reflective surface 53 in the optical axis direction changes depending on the height of the input light beam, and in order to further reduce such an influence, the input lens surface 51 and the output lens surface 52 are preferably free-form surfaces which are asymmetric in the sub scanning direction.

FIGS. 7A to 7C are explanatory diagrams showing examples in which a variation in light intensity of the lens array 50 is reduced. In FIG. 7A, the lens element 54 is formed to a non-linear shape such that the width thereof is different depending on positions in the main scanning direction and is formed to a wave shape as a whole in order to reduce variations in the light intensity at the outer periphery of the lens array 50. Accordingly, possible to reduce unnecessary light beam input to the input lens surface 51. The lens elements 54 are arranged without any gap therebetween so as to allow a part of stray light to occur from a border between the lenses.

FIG. 7B shows an example in which a light shielding plate 58 with a slit for reducing a variation in the light intensity is arranged on the side of an object surface of the lens element 54. The light shielding plate 58 includes a wave-shaped slit in the longitudinal direction of the lens array 50. In order to prevent stray light from being occurring at the border between the lens elements 54, ink 59 may be applied to the border between lenses such that the light is shielded only at the border between the lens elements 54.

FIG. 7C shows an example in which a light shielding plate 60 with an aperture for shielding light between the lens elements 54 is arranged on the side of the object surface instead of the light shielding plate 58. The light shielding plate 58 or the light shielding plate 60 makes it possible to reduce unnecessary light beams input in the input lens surface 51.

Figure 8:
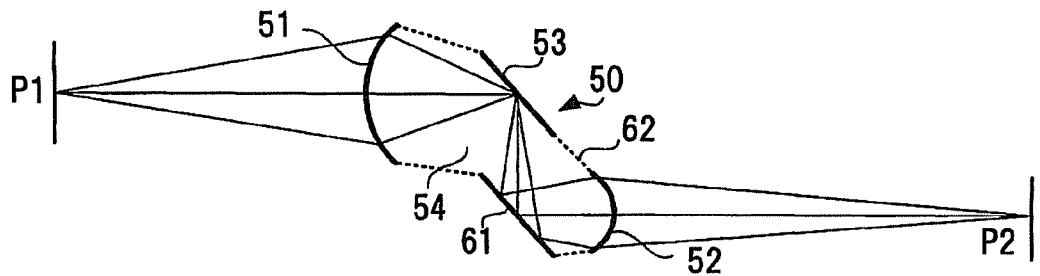
FIG. 8 is a front view showing a modified example of the lens array according to the embodiment.

FIG. 8 is a front view showing a modified example of the lens array 50 according to the first embodiment. In FIG. 8, a reflective surface 61 is additionally provided.

The light reflected by the reflective surface 53 is reflected by the reflective surface 61 to guide the light to the output lens 52, and a main light beam of the input light and a main light beam of the output light are substantially parallel to the sub scanning direction. The reflective surface 61 may be a one flat surface or a free-form surface which is asymmetric in the sub scanning direction. In addition, the lens array 50 includes a supporting surface 62 which is supported by a supporting member such as a case body.

The scanning head 19 shown in FIGS. 1 and 2 and the image sensor 16 shown in FIGS. 1 and 3 are examples in which the lens array 50 shown in FIG. 8 is used. That is, if the lens array 50 in FIG. 8 is used in the scanning head 19 in FIG. 2, the object point P1 corresponds to the LED element 43, and the image plane (P2) corresponds to the photoconductive drum 22. In addition, if the lens array 50 in FIG. 8 is used in the image sensor 16 in FIG. 3, the object point P1 corresponds to the surface of the document placed on the document table 12, and the image plane (P2) corresponds to the sensor 49.

Figure 9A:
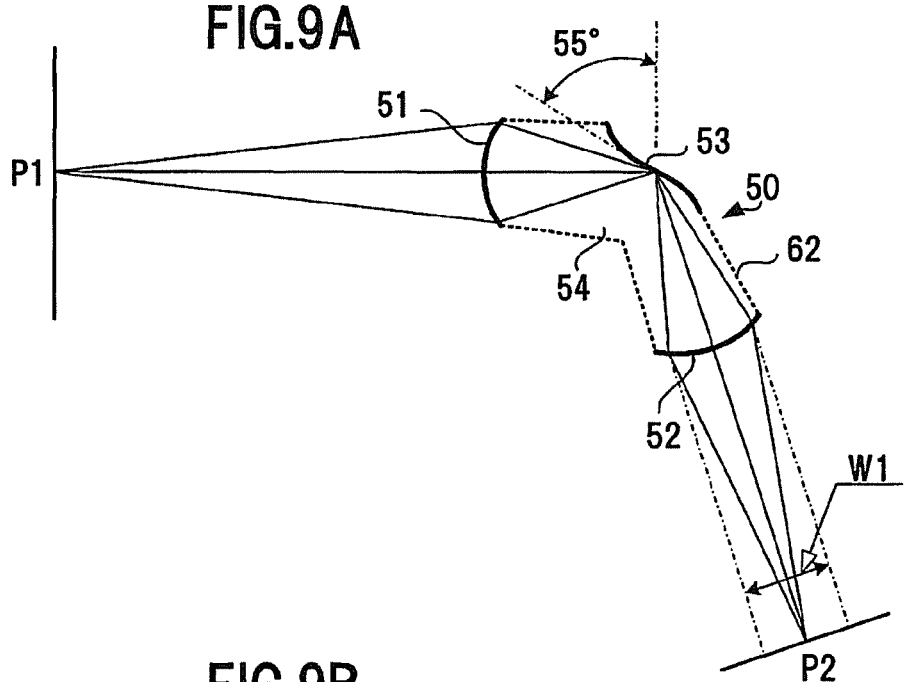
FIGS. 9A and 9B are a front view and a planar view showing another modified example of the lens array according to the embodiment.
Figure 9B:
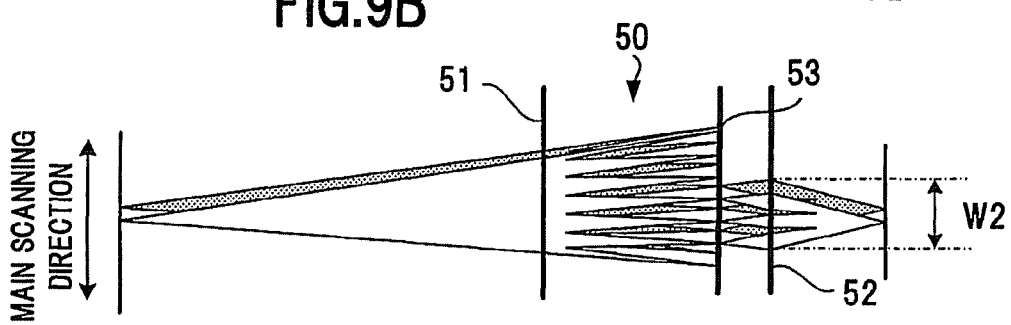

FIGS. 9A and 9B show another modified example of the lens array 50 according to the first embodiment. FIGS. 9A and 9B are diagrams in which a folding-back angle of the reflective surface 53 is 55° and the reflective surface is formed to an asymmetric shape in the sub scanning direction. FIG. 9A is a front view, and FIG. 9B is a planar view of the lens array viewed in the main scanning direction. In the lens array 50 shown in FIGS. 9A and 9B, a degree of asymmetry of the reflective surface 53 in the sub scanning direction is larger than that in FIG. 6A. In addition, widths W1 and W2 of the light beam, which forms an image at one point on the image plane, in the main scanning direction and the sub scanning direction on the output lens surface 52 are designed to be substantially the same (the width W1 in the main scanning direction is a width between outermost light beams among light beams passing through the plurality of output lens surfaces 52).

By setting the widths W1 and W2 in the main scanning direction and the sub scanning direction on the output lens surface 52 to the same, substantially the same levels of blur at the time of defocusing or substantially the same levels of degradation in the image forming property in the main scanning direction and the sub scanning direction when the document surface is deviated can be obtained. If the levels of blur at the time of defocusing are different in the main scanning direction and the sub scanning direction, deviation is viewed in forming the image. However, since the blur is similarly viewed in both the main scanning direction and the sub scanning direction, feeling of strangeness from an input image if the lens array 50 is used in the image sensor 16 or from an output image if the lens array 50 is used in the scanning head 19 can be reduced.

Figure 10A:
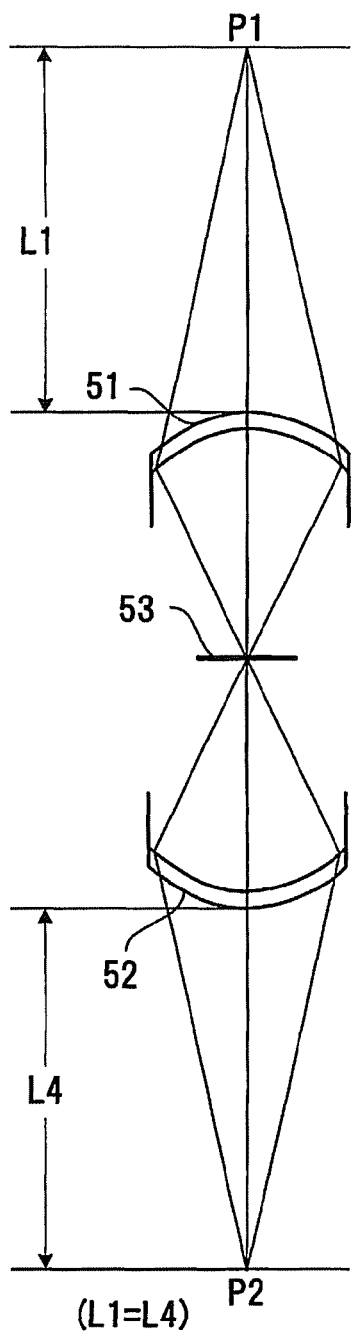
FIGS. 10A and 10B are explanatory diagrams showing an equivalent air distance of the lens array according to the embodiment.
Figure 10B:
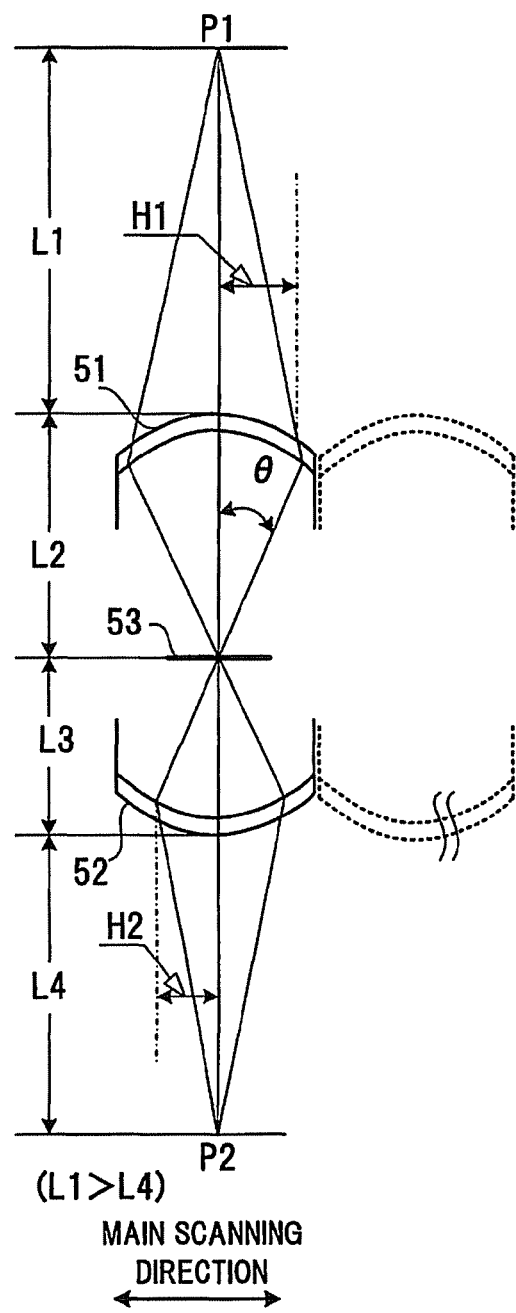

FIGS. 10A and 10B are explanatory diagrams of an equivalent air distance of the lens array 50 and are planar views of the lens array 50 viewed in the main scanning direction. For the purpose of convenience, a center line of an input light beam and a center line of an output light beam are shown on one straight line.

FIG. 10A shows a case in which an equivalent air distance L1 from the object point P1 to the input lens surface 51 is equal to an equivalent air distance L4 from the output lens surface 52 to the image plane p2.

FIG. 10B shows an example of a relationship (L1>L4) in which the equivalent air distance L1 from the object point to the input lens surface 51 is greater than the equivalent air distance L4 from the output lens surface 52 to the image plane. With the relationship of L1>L4, possible to prevent the light beam from reaching the border between lenses at the output lens surfaces 52 in the main scanning direction and prevent stray light from occurring. In addition, L2 represents an equivalent air distance from the input lens surface 51 to a first image forming position (an image forming position of an inverted image), and L3 represents an equivalent air distance from the first image position (the image forming position of the inverted image) to the output lens surface 52. That is, $$L1/L2 = L4/L3 \quad (1)$$

is set to obtain an equal magnification optical system.

With the relationship of L1>L4, a relationship of L2>L3, namely a relationship of (L3/L2)<1 is obtained.

A distance between the lenses is represented as 2×H1 where H1 represents a height from an optical axis of the input lens surface 51 to the border with the adjacent lens. If light which has passed near the lens border at the input lens surface 51 travels at an angle θ from the optical axis, a height H2 of the light beam at the output lens surface 52 is represented as:

$$H2 = H1 \times (L3/L2) \quad (2).$$

Since (L3/L2)<1, H2<H1 is obtained, and therefore, the input light which has passed through the input lens surface 51 does not reach the border at the output lens surface 52. Accordingly, stray light does not occur at the output lens surface 52. That is, since there is room at an outer part of the output lens surface 52, possible to reduce light exposure of the border surface with the next lens element, occurrence of stray light, and scattering of the light beam in other directions.

In the case of a pair of two lenses, lenses manufactured with a same mold to have the same cavities are combined such that relative positions are not deviated in a direction which is vertical to the optical axes of the lenses. For this reason, necessary to obtain a relationship of L2=L3, and the relationship shown as Equation (2) cannot be employed. Since the lens element 54 is configured by one lens in this embodiment, two lenses are not combined even if the relationships shown as Equations (1) and (2) are employed. Therefore, deviation of the relative positions is not degraded even if L2≠L3 as compared with the case of L2=L3. Accordingly, be possible to reduce a problem in that the relative positions are easily deviated in the direction which is vertical to the optical axes of the lenses.

Figure 11:
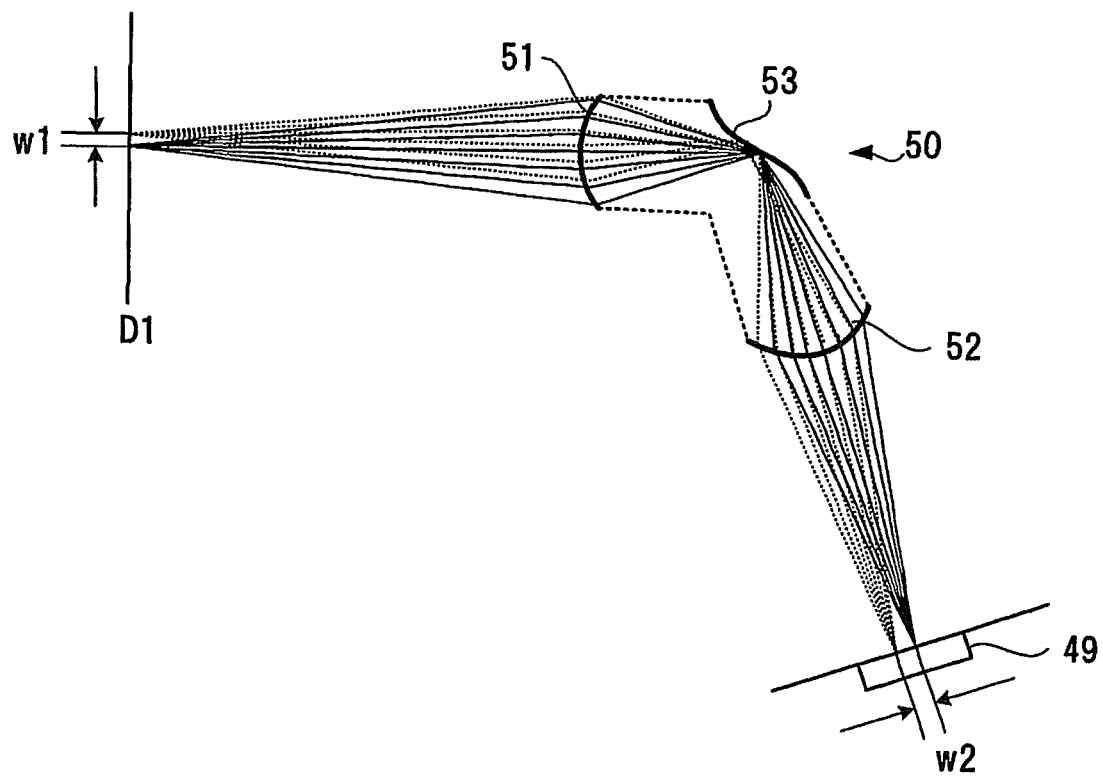
FIG. 11 is an explanatory diagram showing an example in which the lens array is used in the image sensor.

FIG. 11 is an explanatory diagram showing an example in which the lens array 50 in FIGS. 9A and 9B is used in the image sensor 16. In FIG. 11, the lens array 50 is arranged between a document surface D1 and the sensor 49.

In relation to the output lens surface 52, a position of a main light beam passing through the output lens surface 52 is also deviated from an optical axis of the output lens surface 52, if a position of the object point in the sub scanning direction is different from the optical axis as shown in FIG. 11. In order to form an image without vignetting of light beam even if the position of the object point in the sub scanning direction is different from the optical axis, necessary to expand an effective area of the output lens surface 52 in the sub scanning direction.

Although the description was given of the main scanning direction in FIGS. 10A and 10B, the light output from the object point on the optical axis is in the same relationship even in the sub scanning direction.

Therefore, in relation to the light output from the object point on the optical axis, $$H2 = H1 \times (L3/L2)$$

and $$L1/L2 = L4/L3$$

are satisfied as described above, and this can be modified into $$L3/L2 = L4/L1 \quad (3)$$

If Equation (3) is substituted into Equation (2)

$$H2 = H1 \times L4/L1$$

is satisfied, and this can be modified into $$H2/L4 = H1/L1 \quad (4).$$

In relation to the sub scanning direction, H1 and H2 can be understood as widths through which the light beam passed in the sub scanning direction when the object point is on the optical axis. Since necessary that an effective area H2' of the output lens surface 52 in the sub scanning direction also cover a case where the object point is not on the optical axis in the sub scanning direction, preferable that $$H2' > H2, \text{ and}$$

$$H2'/L4 > H1/L1 \quad (5).$$

In other words, the effective area width of the output lens surface 52 in the sub scanning direction/the equivalent air distance L4 from output lens surface 52 to the image plane, is preferably set to be larger than the effective area width of the input lens surface 51 in the sub scanning direction/the equivalent air distance L1 from the object point to the input lens surface 51, in relation to the sub scanning direction.

In addition, if the lens array 50 in FIG. 11 is applied to a document reading apparatus (image sensor), for example, and a document reading position is deviated in a range of a predetermined width w1, a readable range w2 is similar to the width w1 on the side of the sensor.

FIGS. 12A and 12B are diagrams showing still another modified example of the lens array 50 according to the first embodiment. FIG. 12A is a front view, and FIG. 12B is a planar view. FIGS. 12A and 12B show an example in which a reflective surface 63 is added and the reflective surface 53 and the reflective surface 63 are respectively free-form surfaces which are asymmetric in the sub scanning direction. In the example of FIGS. 12A and 12B, the main light beam of the input light and the main light beam of the output light are substantially parallel to the sub scanning direction in the same manner as in FIG. 8. In addition, the lens array 50 includes a support surface 64 which is supported by a supporting member such as a case body.

In addition, FIGS. 12A and 12B show a state in which light beams output from positions other than the optical axis (one-dotted chain line) form images at positions deviated in the same directions by the same amounts (that is, as erect and equally-magnified images) in the main scanning direction and in the sub scanning direction.

Figure 13A:
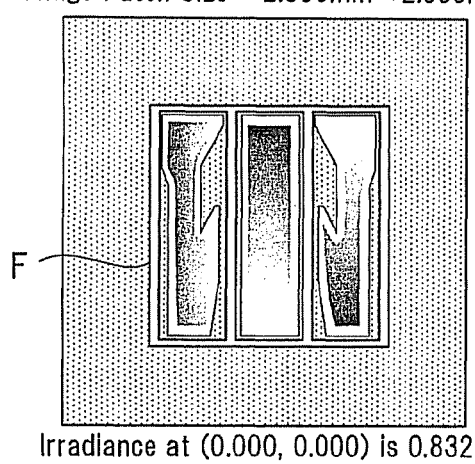
FIGS. 13A to 13C are explanatory diagrams showing states of a light beam in an output lens surface.
Figure 13C:
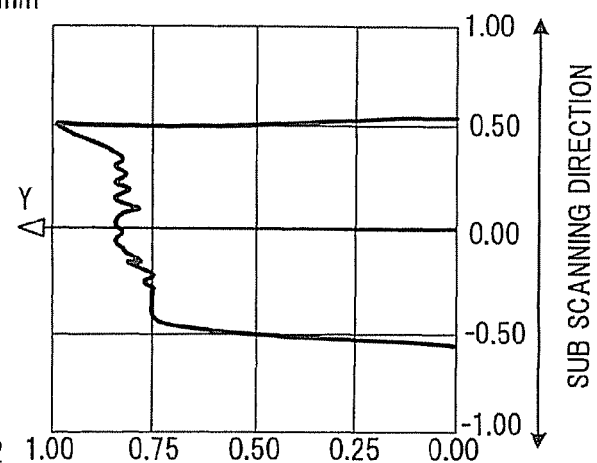
Figure 13B:
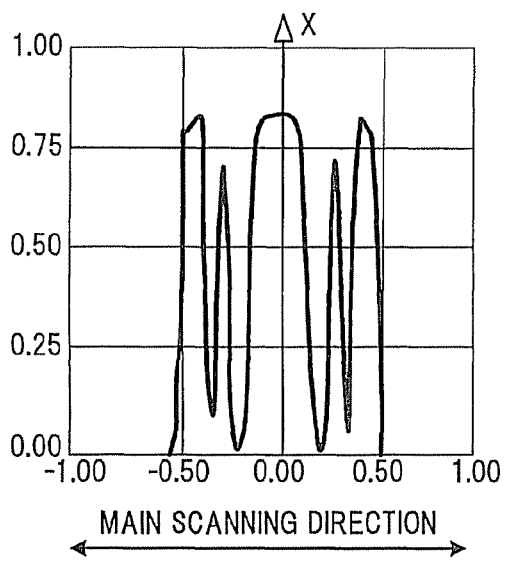

FIGS. 13A to 13C are diagrams showing a state of light beams at the output lens surface 52 of the lens array 50 shown in FIG. 12. FIG. 13A is a diagram viewed from the side of the image plane, FIGS. 13B and 13C show light intensity distribution at the centers in the main scanning direction and the sub scanning direction. A square F depicted by a white line in FIG. 13A represents an outer edge of the output lens surface 52. An outermost widths of the light beams in FIG. 13A in the main scanning direction and the sub scanning direction are substantially the same. In addition, intervals (−0.5 to 0.5 mm) at parts where the light intensity in the main scanning direction and the sub scanning direction suddenly falls are about mm, and it can be found that the intervals are substantially the same in FIGS. 13B and 13C.

In FIGS. 13B and 13C, since the light output from the output lens surface is collected at a point on an image forming surface where the light beams similarly expanding in the main scanning direction and the sub scanning direction intersect each other at one point, convergent angles in the main scanning direction and the sub scanning direction are the same. Therefore, the image expands to the same degrees both in the main scanning direction and in the sub scanning direction at a position deviated from the image forming surface, and degrees of blur in the image become substantially the same in the main scanning direction and the sub scanning direction even if the image plane position is deviated.

FIGS. 14 to 22 are explanatory diagrams showing some examples in which the input lens surface 51, the output lens surface 52, and the reflective surface 53 of the lens element 54 have asymmetric shapes in the sub scanning direction.

Figure 14:
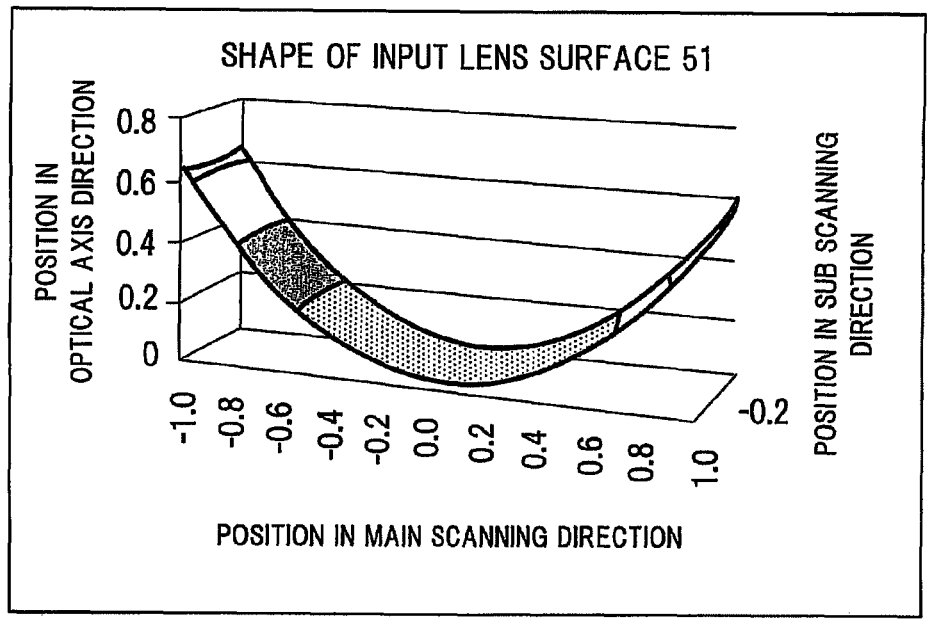
FIG. 14 is an explanatory diagram showing a shape of an input lens surface of the lens array according to the embodiment.
Figure 15:
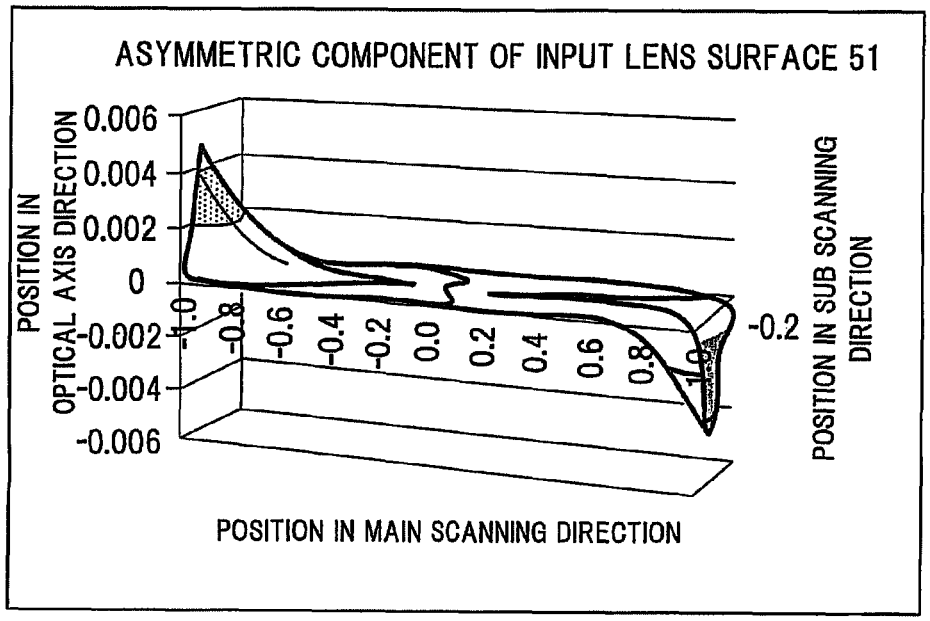
FIG. 15 is an explanatory diagram showing an asymmetric component due to the shape of the input lens surface.

FIG. 14 shows the shape of the input lens surface 5i. FIG. 15 shows an asymmetric component due to the shape of the input lens surface 51 in FIG. 14.

Figure 16:
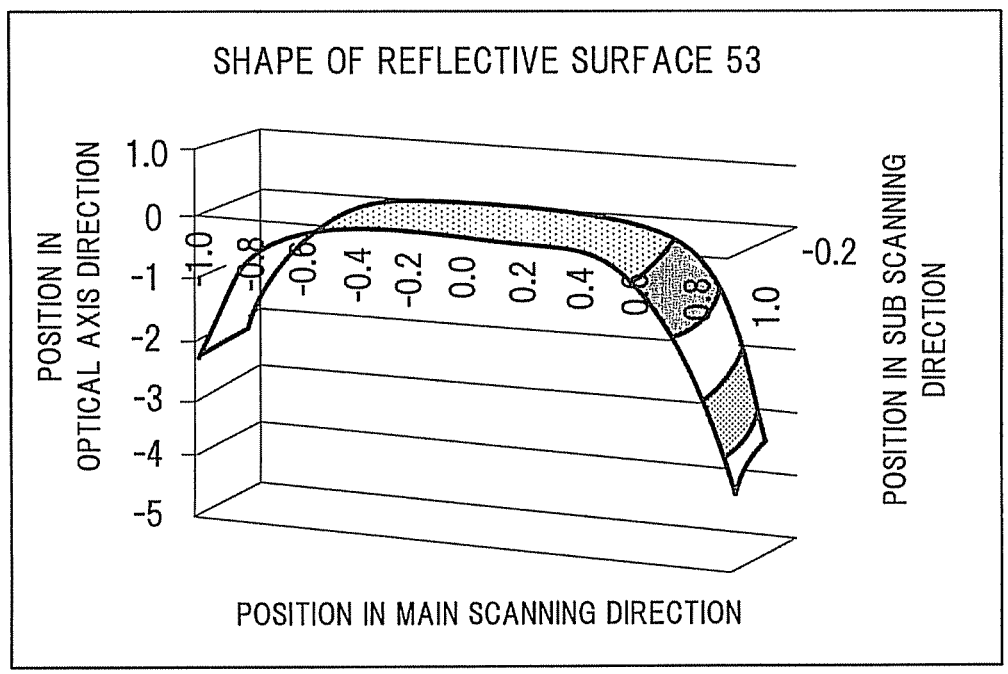
FIG. 16 is an explanatory diagram showing a shape of a reflective surface of the lens array according to the embodiment.
Figure 17:
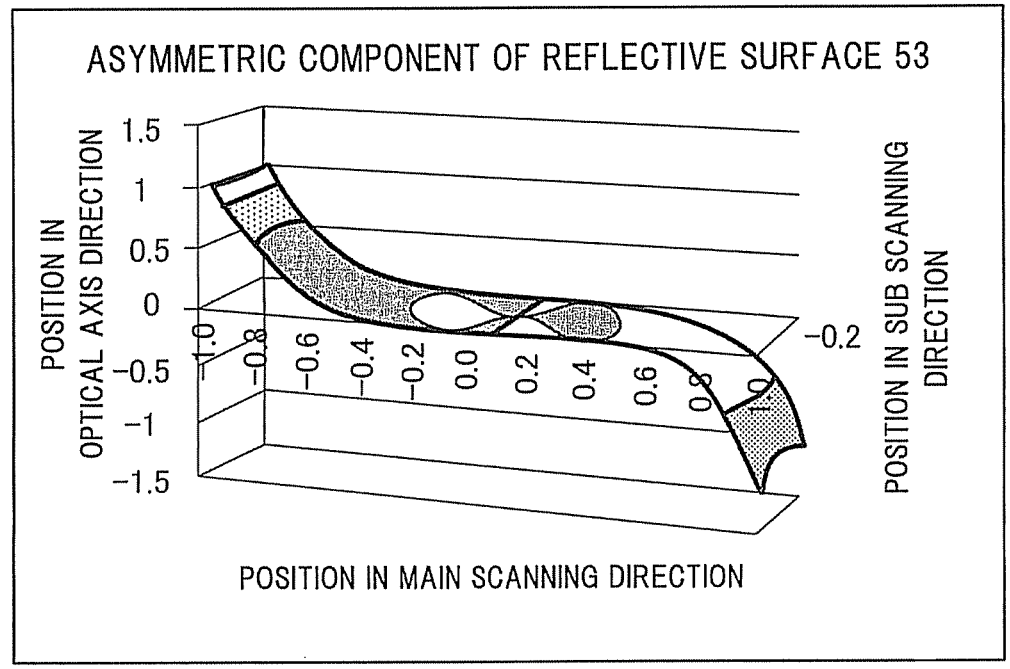
FIG. 17 is an explanatory diagram showing an asymmetric component due to the shape of the reflective surface.

FIG. 16 shows the shape of the reflective surface 53. FIG. 17 shows an asymmetric component due to the reflective surface 53 in FIG. 16.

Figure 18:
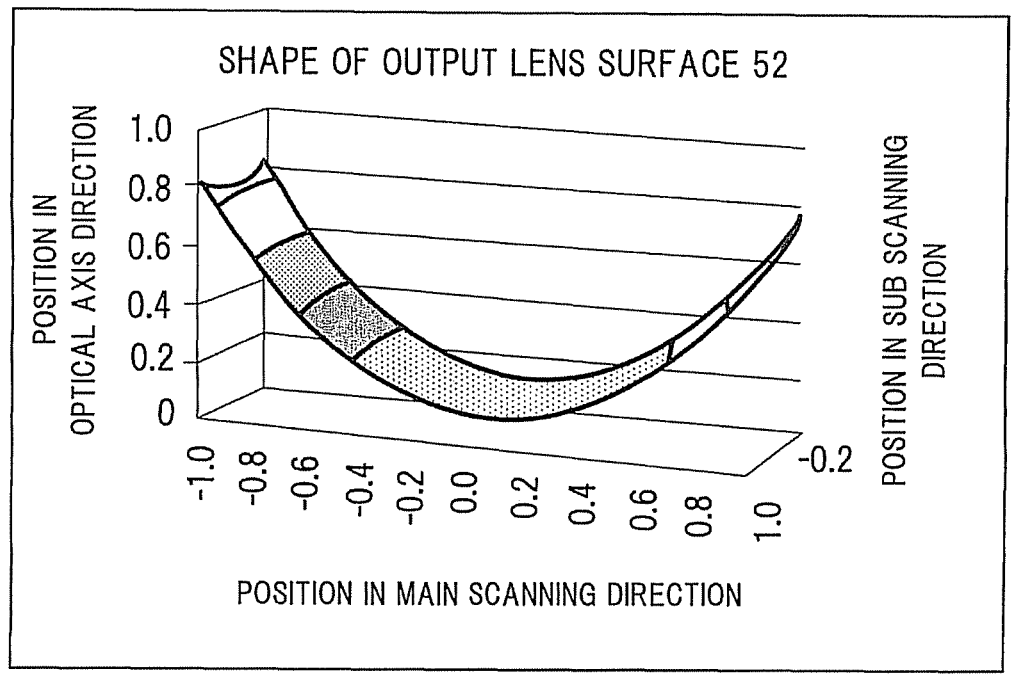
FIG. 18 is an explanatory diagram showing a shape of an output lens surface of the lens array according to the embodiment.
Figure 19:
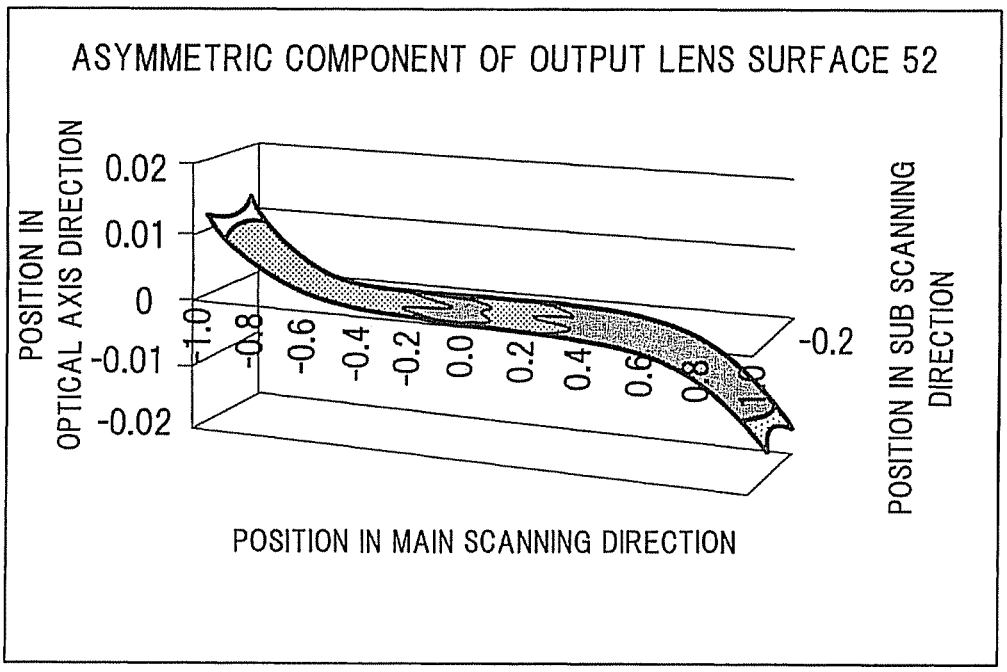
FIG. 19 is an explanatory diagram showing an asymmetric component due to the shape of the output lens surface.

FIG. 18 shows the shape of the output lens surface 52. FIG. 19 shows an asymmetric component due to the output lens surface 52 in FIG. 18.

Figure 20:
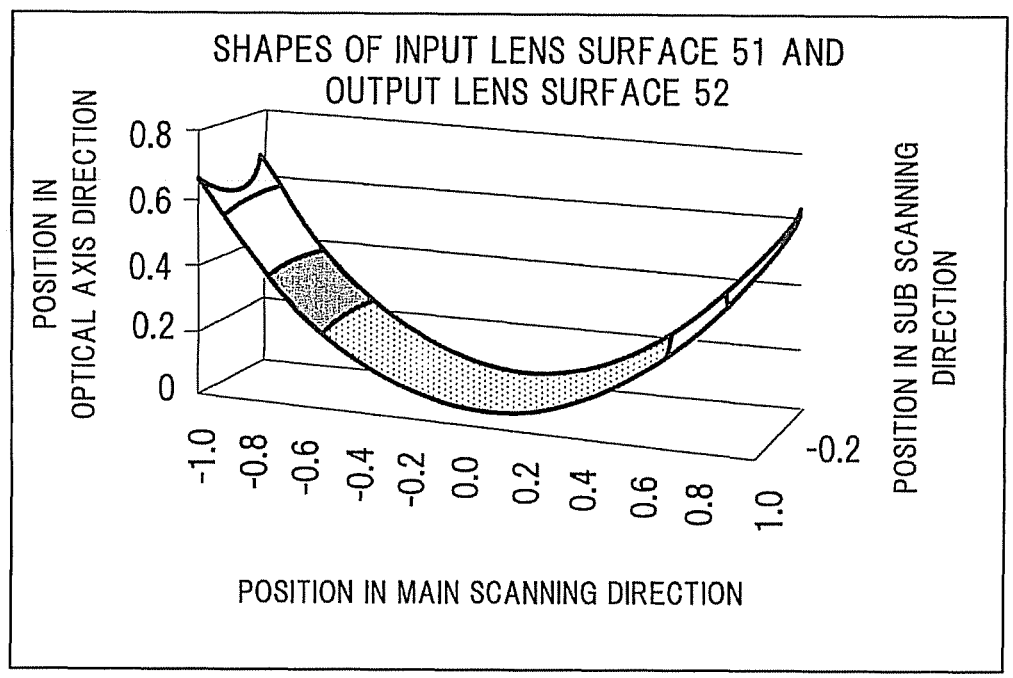
FIG. 20 is an explanatory diagram showing other shapes of the input lens surface and the output lens surface of the lens array according to the embodiment.
Figure 21:
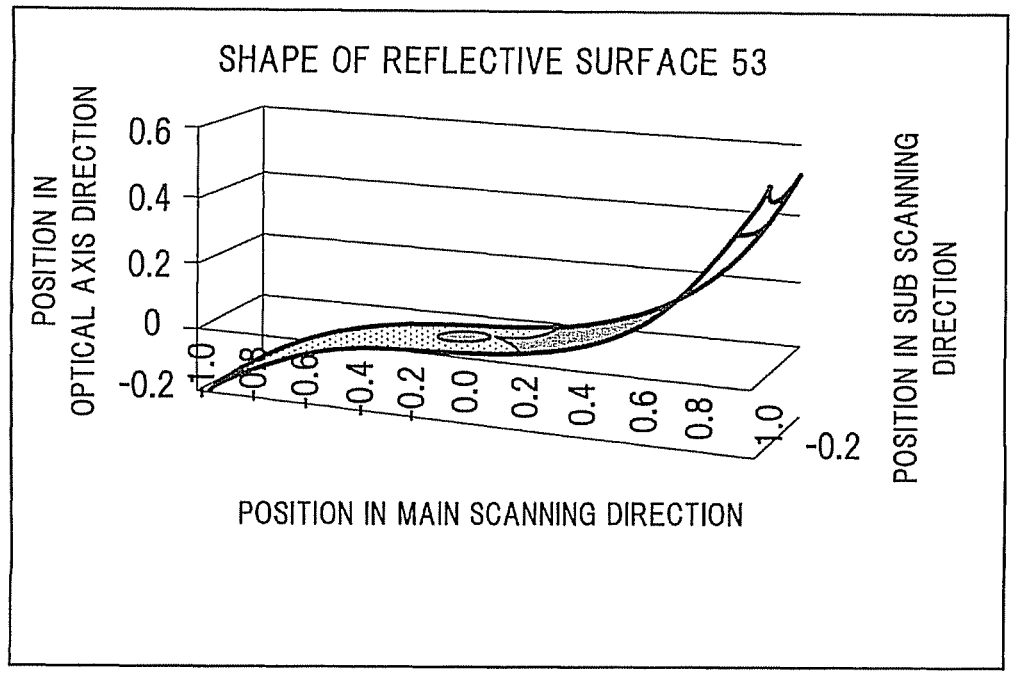
FIG. 21 is an explanatory diagram showing another shape of the reflective surface of the lens array according to the embodiment.
Figure 22:
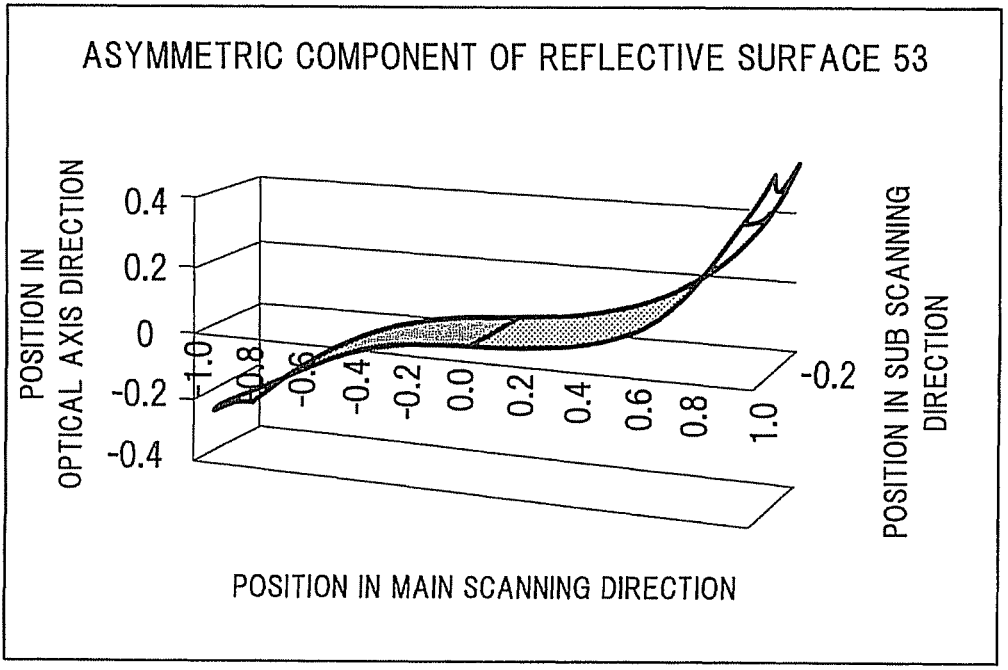
FIG. 22 is an explanatory diagram showing an asymmetric component due to the shape of the reflective surface.

FIG. 20 shows an example in which the input lens surface 51 and the output lens surface 52 are rotationally symmetric surfaces. FIG. 21 shows the shape of the reflective surface 53 which is asymmetric in the sub scanning direction. FIG. 22 shows an asymmetric component due to the reflective surface 53 in FIG. 21.

Second Embodiment

Figure 23:
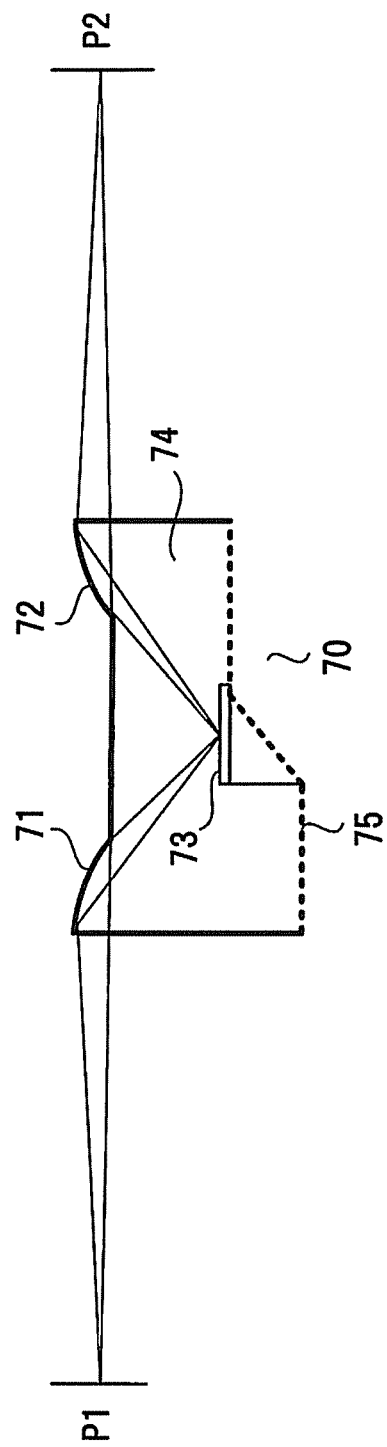
FIG. 23 is a front view showing a basic configuration of an imaging element array (mirror array) according to a second embodiment.

Next, description will be given of a configuration of an imaging element array according to a second embodiment. FIG. 23 is a front view showing an imaging element array 70 (mirror array 70) according to the second embodiment. In addition, the lens array 50 according to the first embodiment and the mirror array 70 according to the second embodiment are collectively referred to as the imaging element array.

In the second embodiment, the mirror array 70 includes a mirror element group configured by a plurality of mirror elements 74. Each mirror element 74 is configured by one mirror member, includes an input mirror surface 71 as the input portion and an output mirror surface 72 as the output portion instead of the input lens surface 51 and the output lens surface 52, and further includes a reflective portion (reflective surface 73) which is the same as the reflective surface 53. In addition, a supported surface 75 which is supported by a supporting member such as a case body is provided at the outer periphery of the mirror element 74.

In FIG. 23, the input mirror surface 71 and the output mirror surface 72 have asymmetric shapes in the sub scanning direction. In the mirror array 70, the plurality of mirror elements 74 are aligned in the main scanning direction such that the input mirror surfaces are adjacent to each other and the output mirror surfaces are adjacent to each other. In addition, the mirror elements 74 are integrally formed by resin or glass.

The mirror surface 71 exhibiting power and the outer peripheral of the mirror surface 72 have non-linear shapes. By forming the mirror surface 71 and the outer periphery of the mirror surface 72 in non-linear shapes, possible to uniformize the light intensity. Alternatively, a light shielding plate with a wave-form slit or an aperture as shown in FIGS. 7B and 7C may be arranged on the side of the object point of the mirror surface 71 exhibiting power in the same manner as in FIGS. 7B and 7C.

In addition, the effective area width of the mirror surface 72 in the sub scanning direction/the equivalent air distance L4 from the mirror surface 72 to the image plane is set to be larger than the effective area width of the mirror surface 71 in the sub scanning direction/the equivalent air distance L1 from the object point to the mirror surface 71 in the sub scanning direction in the same manner as described above in FIGS. 10A and 10B.

In addition, since a beam position is deviated at the output mirror surface 72, the effective area of the output mirror surface 72 in the sub scanning direction is expanded by an amount corresponding to the positional deviation of the beam. In addition, the light beam widths (W1, W2) at the output surface in the main scanning direction and the sub scanning direction are set to be substantially the same so as to obtain substantially the same degrees of blur at the time of defocusing in the main scanning direction and the sub scanning direction in the same manner as in FIGS. 9A and 9B.

If the mirror array 70 in FIG. 23 is used in the scanning head 19 in FIG. 1, the object point P1 corresponds to the LED element 43, and the image plane (P2) corresponds to the photoconductive drum 22. In addition, if the mirror array 70 is used in the image sensor 16 in FIG. 1, the object point P1 corresponds to the surface of the document placed on the document table 12, and the image plane (P2) corresponds to the sensor 49.

According to the aforementioned embodiments, the imaging element array (the lens array, the mirror array) is formed by one molded article, and therefore, it is possible to suppress relative positional deviation of the lenses and the mirrors. Furthermore, since the reflective surface is positioned near the place where the light is collected, it is possible to relatively easily secure reflection accuracy. In addition, since only one kind of lens material is used, pre-processing before molding is not required, and it is possible to shorten molding time and thus to shorten time for manufacturing the lenses.

Although the description was given of the embodiment in which the scanner unit 15 as the reading device is included as a part of the image forming apparatus, exemplary embodiments are not limited thereto, and the scanner unit 15 itself may configure an image forming apparatus.

While certain embodiments have been described, these embodiments have been presented by way of example only, and are not intended to limit the scope of the invention. Indeed, the novel arrays and apparatus described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An imaging element array comprising:
   an imaging element group in which a plurality of imaging elements are aligned in a main scanning direction, each of the imaging elements including an integrally molded input portion, an output portion, and a reflective portion which has a free form reflective surface which is asymmetric in a sub scanning direction, each of the imaging elements collecting light input to the input portion, reflecting the light by the reflective portion near a position where light flux is downsized, the reflected light being collected on a side which is slightly closer to the output portion than the reflective portion, and outputting the reflected light from the output portion to form an image at an image point; and
   an inhibiting portion which is formed around the reflected portion in the imaging element group to inhibit light other than the light reflected by the reflective portion from traveling to the output portion, wherein the imaging elements are formed into a non-linear shape such that widths of the input portions are different depending on positions in the main scanning direction.

2. The imaging element array of claim 1,
wherein for each of the imaging elements, the input portion includes an input lens surface to which the light is input, the reflective surface of the reflective portion reflects the light input to and collected at the input lens surface near the position where the light flux is downsized, and the output portion includes an output lens surface from which the light reflected by the reflective surface is output for forming an image at the image point with the light output from the output lens surface.

3. The imaging element array of claim 1,
wherein for each of the imaging elements, the input portion includes an input mirror surface to which the light is input, the reflective surface of the reflective portion reflects the light input to and collected at the input mirror surface near the position where the light flux is downsized, and the output portion includes an output mirror surface from which the light reflected by the reflective surface is output for forming an image at the image point with the light output from the output mirror surface.

4. The imaging element array of claim 1,
wherein the reflective portion of the imaging element is inclined at an angle, which meets total reflection conditions, with respect to an optical axis of the input light.

5. The imaging element array of claim 1, further comprising:
a light shielding plate which includes a slit or an aperture in an alignment direction of the plurality of imaging elements in order to inhibit unnecessary light from being input to the input portions of the imaging elements, provided in the imaging element group.

6. The imaging element array of claim 1,
wherein each of the imaging elements further includes a second reflective portion which reflects the light reflected by the reflective portion, and the output portion is provided so as to face the second reflective portion such that an optical axis of the light output from the output portion is parallel to an optical axis of the input light.

7. The imaging element array of claim 1,
wherein in each of the imaging elements, (an effective area width of the output lens surface in the sub scanning direction/an equivalent air distance from the output lens surface to the image plane) is set to be larger than (an effective area width of the input lens surface in the sub scanning direction/an equivalent air distance from an object-point to the input lens surface) in relation to the sub scanning direction.

8. The imaging element array of claim 1,
wherein the plurality of imaging elements are aligned in a main scanning direction such that light beam widths at the output plane in the main scanning direction and a sub scanning direction are substantially the same.

9. An image forming apparatus comprising:
a light source unit which is arranged so as to face an image carrier and irradiates the image carrier with light in a main scanning direction;
an imaging element group in which a plurality of imaging elements are aligned in a main scanning direction, each of the imaging elements including an integrally molded input portion to which the light from the light source unit is input, an output portion and a reflective portion which has a free form reflective surface which is asymmetric in a sub scanning direction, each of the imaging elements collecting the light input to the input portion, reflecting the light by the reflective portion at a position where light flux is downsized, the reflected light being collected on a side which is slightly closer to the output portion than the reflective portion, and outputting the reflected light from the output portion to form an image on the image carrier;
an inhibiting portion which is formed around the reflective portion in the imaging element group to inhibit light other than the light reflected by the reflective portion from traveling to the output portion;
a developing unit which supplies developing agent to the image carrier and forms a toner image on the image carrier; and
a transfer unit which transfers the toner image formed on the image carrier by the developing unit to a recording medium,
wherein the imaging elements are formed into a non-linear shape such that widths of the input portions are different depending on positions in the main scanning direction.

10. An image forming apparatus comprising:
a sensor unit which is arranged in a main scanning direction of a document;
an illumination unit which is provided in the main scanning direction of the document to irradiate a surface of the document with light;
an imaging element group in which a plurality of imaging elements are aligned in a main scanning direction, each of the imaging elements including an integrally molded input portion to which the light from the surface of the document is input, an output portion, and a reflective portion which has a free form reflective surface which is asymmetric in a sub scanning direction, each of the imaging elements collecting the light input to the input portion, reflecting the light by the reflective portion at a position where light flux is downsized, the reflected light being collected on a side which is slightly closer to the output portion than the reflective portion, and outputting the reflected light from the output portion to form an image on the sensor unit;
an inhibiting portion which is formed around the reflective portion in the imaging element group to inhibit light other than the light reflected by the reflective portion from traveling to the output portion,
wherein the imaging elements are formed into a non-linear shape such that widths of the input portions are different depending on positions in the main scanning direction.

* * * * *